March 10, 1970      W. G. McCLEAN      3,499,616
DRIVE SYSTEM FOR A FILAMENT WINDING MACHINE
Filed Jan. 22, 1968
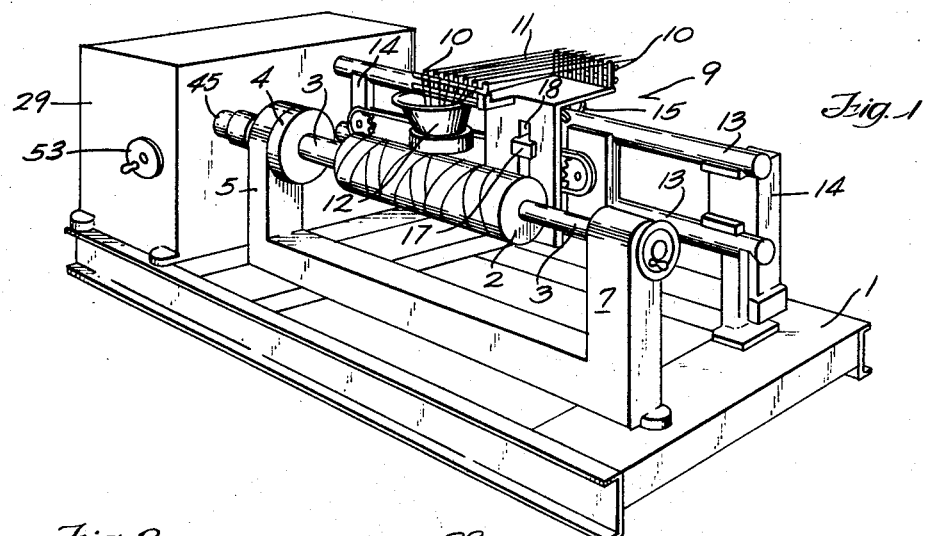
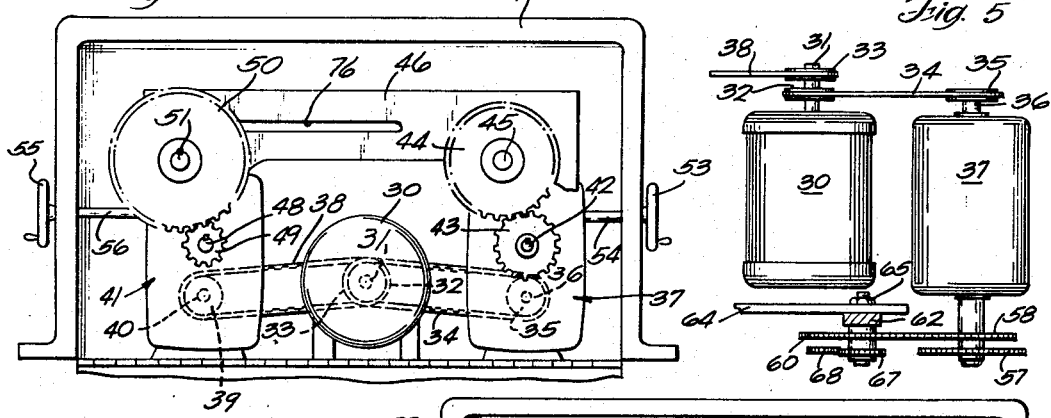
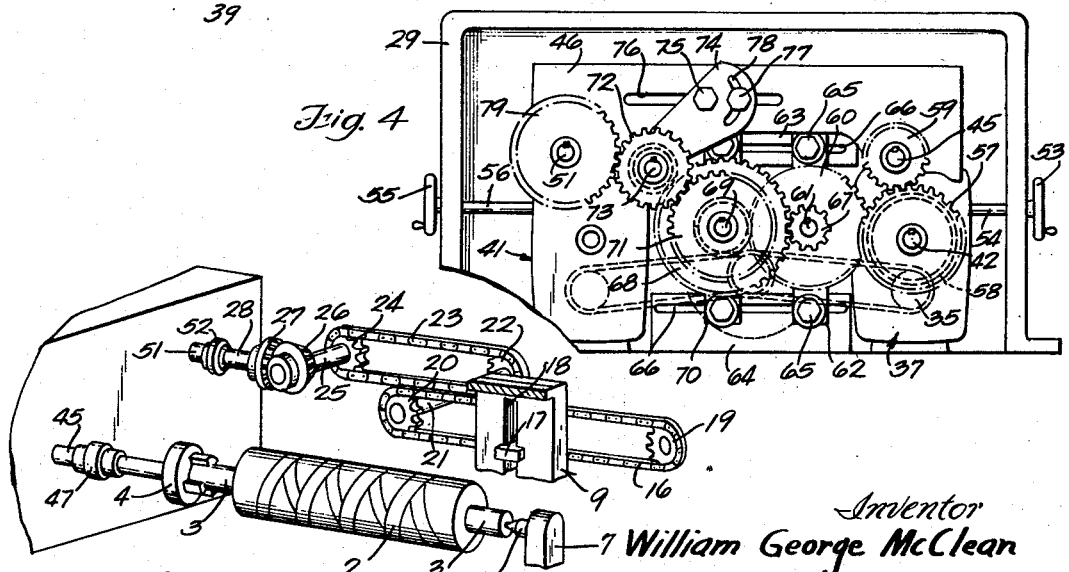
Inventor
William George McClean
By Andrew & Stark
Attorneys

United States Patent Office 3,499,616
Patented Mar. 10, 1970

3,499,616
DRIVE SYSTEM FOR A FILAMENT WINDING MACHINE
William G. McClean, Milwaukee, Wis., assignor to McClean-Anderson, Inc., Milwaukee, Wis., a corporation of Wisconsin
Filed Jan. 22, 1968, Ser. No. 699,730
Int. Cl. B65h 57/28
U.S. Cl. 242—158                          6 Claims

ABSTRACT OF THE DISCLOSURE

The drive mechanism for a filament winding machine including a single motor which operates a pair of variable speed transmissions. In one arrangement of the drive, the output of each transmission is connected to the carriage of the winding machine and to the mandrel, respectively, so that the speed of the mandrel rotation and carriage travel can be individually varied through the respective transmissions.

In a second arrangement of the drive, the output of one transmission is connected to both the carriage and the mandrel.

---

Tubular reinforced plastic articles are generally fabricated by winding a strand or filament of reinforcng material coated with resin about a mandrel in a generally helical pattern. In the conventional process, the mandrel is rotated and the reinforcing strand is guided onto the mandrel by a winding head which reciprocates along the length of the mandrel to wind the strand on the mandrel in a series of superimposed layers with each layer having the opposite helix angle. The helix angle used in the winding operation is determined by the relative speed between the mandrel rotation and the travel of the winding head or carriage.

It is often desirable to include a mechanism for conveniently varying the speed of travel of the carriage, or the speed of rotation of the mandrel, or both, to thereby vary the helix angle and the winding pattern. In the past, separate drive systems have been employed for both the carriage and the mandrel, with each drive system having its own motor. While the speed of the carriage and the mandrel can be varied with this type of system using independent motors, line voltage fluctuations are apt to provide a different variation in speed of each motor and thereby upset the precise relationship between the carriage and mandrel speed. The use of a single motor, driving both the carriage and mandrel, avoids the problem of voltage fluctuations, but decreases the versatility of the machine. With a single motor system, the carriage speed and mandrel speed cannot be varied independently of each other without changing the gearing of the drive mechanism.

The present invention relates to a variable speed drive for a filament winding machine. A single motor drives a pair of variable speed transmissions, and in one arrangement of the drive system, the output of one transmission is connected to the carriage while the output of the other transmission is connected to the mandrel. In this arrangement, the carriage speed and mandrel speed can be independently adjusted by adjustment of the respective variable speed transmissions.

In a second arrangement of the drive system, the output of one transmission is connected through gear trains to both the carriage and the mandrel. With this arrangement, adjustment of the single variable speed transmission will vary the speed of both the carriage and mandrel, making the system adaptable for high accuracy winding where repeatable performance is desired.

With the drive system of the invention, a single motor is employed and using one arrangement of the drive, it is possible to obtain individual speed control for both the carriage and the mandrel to provide a versatile winding system, particularly adaptable for setting up a winding program by adjustment of the helix angle. By converting the drive to the second form, both the carriage and the mandrel are tied in to a single variable speed transmission so that the speed of the carriage and the mandrel will be adjusted together. This drive system results in high accuracy winding and repeatable performance.

Other objects and advantages will appear in the course of the following description.

The drawings illustrate the best mode presently contemplated of carrying out the invention.

In the drawings:

FIG. 1 is a perspective view of a filament winding machine incorporating the drive system of the invention;

FIG. 2 is a vertical section of the drive mechanism of the invention arranged so that separate transmissions are employed to operate the carriage and mandrel;

FIG. 3 is a schematic perspective view showing the drive connections to the carriage and to the mandrel;

FIG. 4 is a view similar to FIG. 2 showing a modified form of the invention arranged so that the output of a single transmission is connected to the carriage and mandrel; and FIG. 5 is a fragmentary horizontal section of the structure shown in FIG. 4.

The drawings illustrate a filament winding machine for fabricating a fiber reinforced tubular article, such as a pipe section, vessel or the like. The machine includes a frame or bed 1, and a mandrel 2 is mounted for rotation above the frame. Shafts 3 are secured to the ends of the mandrel 2, and one shaft is operably connected to a drive chuck 4 which is a part of headstock 5, while the other shaft 3 is rotatably supported by spindle 6 in tailstock 7. As shown in the drawings, the tailstock is fixed in relation to the headstock 5, but it is contemplated that an adjustable tailstock can be employed which would thereby accommodate mandrels of varying length. The headstock 5 and tailstock 7 are connected together by a base 8.

The reinforcing material is guided onto the mandrel by a carriage 9 which is adapted to travel in a reciprocating path along the length of the mandrel 2. The carriage 9 includes a pair of guide combs 10 which guide the filaments or strands 11 into a funnel guide 12 where the strands are coated with resin and brought together into the form of a tape or band. The fibrous band is wound on the mandrel in a generally helical pattern as the carriage reciprocates.

To guide the carriage in reciprocating movement, a pair of guide rods 13 are supported by vertical supports 14 and extend along the frame 1. The carriage 10 is mounted for travel along the guide rods 13 by rollers 15.

To move the carriage 9 along the guide rods 13, an endless chain 16 is connected to the carriage by a sliding connecting element 17 which is mounted for movement within a slot 18 formed in the carriage 9. The connecting element 17 may be similar to that described in Patent 3,293,927 entitled Chain Locking Mechanism.

As best shown in FIG. 3, chain 16 is carried by a pair of sprockets 19 and 20. The carriage will move with the chain and due to the connection of slide 17 with the slot 18, the slide will move vertically within the slot as the portion of the chain connected to the slide travels over the sprockets 19 and 20 at the ends of its stroke of travel.

Sprocket 20 is secured to a shaft 21 which also carries a sprocket 22 and sprocket 22 is connected by chain 23 to sprocket 24 mounted on shaft 25. The opposite end of shaft 25 carries a bevel gear 26 which engages bevel gear 27 on shaft 28. The drive mechanism of the invention, as hereinafter described, is adapted to be connected to the shaft 28 and to the shaft of chuck 4 to drive the carriage and mandrel.

The drive mechanism is enclosed within a cabinet 29 mounted on the frame 1 of the winding machine. As best shown in FIG. 2, the drive mechanism includes a motor 30, and the drive shaft 31 of the motor carries a pair of pulleys 32 and 33. Pulley 32 is connected by belt 34 to a pulley 35 mounted on the input shaft 36 of a conventional variable speed transmission 37. Similarly, the pulley 33 is connected by a belt 38 to a pulley 39 mounted on the input shaft 40 of variable speed transmission 41.

The output shaft 42 of transmission 37 carries a gear 43 which engages a gear 44 mounted on shaft 45. Shaft 45 is journalled for rotation in a plate 46 and the outer end of the shaft extends through the wall of the cabinet 29 and is coupled to the shaft of chuck 4 by a coupling 47.

In a similar manner, the output shaft 48 of transmission 41 carries a gear 49 which engages a gear 50 mounted on shaft 51. Shaft 51 is also journalled for rotation in the plate 46, and the outer end of shaft 51 extends through the wall of the cabinet 29 and is connected to the shaft 28 by a coupling 52.

With the arrangement shown in FIG. 2, the motor 30 serves to drive both of the variable speed transmissions 37 and 41, and the output of each transmission is connected through the gear trains to the carriage drive shaft 28 and to the mandrel drive, respectively. The output speed of transmission 37 can be varied by the operator by rotating a handle 53 which is operably connected to the transmission mechanism through a shaft 54. Similarly, the output speed of the transmission 41 can be varied through manual rotation of handle 55 connected to the transmission through shaft 56. With this arrangement, the speed of the carriage and the mandrel can be independently varied through rotation of the handles 53 and 55 to thereby obtain individual control of the carriage and mandrel speed. This drive system provides great flexibility and has particular application when setting up a winding program, for the helix angle and pattern of winding can be conveniently varied by changing the relative speeds of the carriage and the mandrel.

FIGS. 4 and 5 illustrate a second arrangement of the drive system in which the output shaft of a single variable speed transmission 37 operates both the carriage and mandrel. In this embodiment, the output shaft 42 of transmission 37 carries a pair of gears 57 and 58. Gear 57 engages and drives a gear 59 mounted on shaft 45. As previously described, shaft 45 is connected by coupling 47 to the chuck shaft and thereby acts to rotate the mandrel.

Gear 58, which is also mounted on shaft 42, engages a gear 60 mounted on shaft 61. Shaft 61 is journalled for rotation on a vertical bar 62 which is adjustably secured between plates 63 and 64. Plate 63 is carried by the plate 46, while the lower plate 64 is mounted on the top surface of the frame 1.

To adjust the position of the shaft 61, the bar 62 is connected to the plates 63 and 64 by bolts 65 which extend through slots 66 formed in the respective plates 63 and 64.

A small gear 67 is also secured to the shaft 61 and drives a large gear 68 mounted on shaft 69. Shaft 69 is journalled on a bar 70 and bar 70 is mounted for adjustable movement on the plates 63 and 64 in a manner similar to that described with respect to the bar 62.

A second gear 71 is also secured to shaft 69 and drives a gear 72 mounted on shaft 73. Shaft 73 is journalled for rotation on the outer end of a pivotable arm 74 which is adjustably connected to the plate 46. As shown in FIG. 4, the arm 74 is connected to the plate 46 by a bolt 75 which extends through a slot 76 in the plate. In addition, a second bolt 77 extends through slot 76 as well as through a second generally curved slot 78 formed in the arm 74. This connection permits the arm 74 to move horizontally with respect to the plate 46 and also permits the arm to pivot about the axis of the bolt 75 due to the connection of 77 with the curved slot 78.

Gear 72 drives a gear 79 which is secured to shaft 51. As previously described, shaft 51 is connected to the carriage drive shaft 28 by coupling 52.

With the drive system, as shown in FIG. 4, the output of the transmission 37 serves to drive both the mandrel and the carriage. By proper selection of the gears, the relative speed between the carriage and the mandrel can be set at any desired value. However, as both the carriage and mandrel are operably connected to the transmission 37, variations of the output speed of transmission 37 through rotation of handle 53 will cause a corresponding variation in both the carriage and mandrel speeds.

The drive mechanism of the invention utilizes a single motor to provide either independent speed control for the carriage and mandrel, or alternately, to provide combined speed control for the carriage and mandrel. By using a single motor, problems of line voltage fluctuation are eliminated, thereby maintaining the precise speed relationship between the carriage and mandrel which is necessary for the winding operation.

I claim:

1. In a filament winding apparatus, a frame, a mandrel member mounted for rotation on the frame, a carriage member mounted for reciprocating travel along a length of the mandrel member and disposed to guide a strand on the mandrel member in a generally helical pattern, a single prime mover, a pair of variable speed transmission units with each transmission unit having an input and an output, first drive means connecting said prime mover to the input of said first transmission unit, second drive means connecting the prime mover to the input of said second transmission unit, first connecting means for connecting the output of the first transmission unit to one of said members to thereby drive said member, second connecting means for selectively connecting the output of said first transmission unit to the other of said members to thereby selectively drive said other member, and third connecting means for connecting the output of said second transmission unit to said other of said members when said second connecting means is disengaged, the operable connection of said first connecting means and said second connecting means acting to drive said carriage member and said mandrel member through a single transmission unit and the operable connection of said first connecting means and said third connecting means acting to drive said carriage member and said mandrel member independently through both of said transmission units.

2. The apparatus of claim 1, wherein said first connecting means, said second connecting means and said third connecting means comprise gear trains.

3. The apparatus of claim 1, and including manual operating means operably connected to each of said variable speed transmission units to manually vary the output speed of said units.

4. The apparatus of claim 1, wherein the output of said first transmission unit and the output of said second transmission unit are fixed with respect to the frame and said second connecting means comprises a series of gears connecting the output of said first transmission unit to the other of said members.

5. The apparatus of claim 4, wherein said gears are adjustably mounted for lateral movement on said frame.

6. In a filament winding apparatus, a frame, a mandrel mounted for rotation on the frame, a carriage mounted for reciprocating travel along a length of the mandrel and disposed to guide a strand on the mandrel in a generally helical pattern, a single motor, a pair of variable speed transmission units with each transmission unit having an input and an output, first drive means connecting said motor to the input of said first transmission unit, second drive means connecting the motor to the input of said second transmission unit, first gear means for connecting the output of the first transmission unit to said mandrel to thereby drive said mandrel, second gear means for selectively connecting the output of said first transmission unit to the carriage to thereby selectively drive said carriage, and third gear means for connecting the output of said second transmission unit to said carriage when said second gear means is disengaged, the operable connection of said first gear means and said second gear means acting to drive said carriage and said mandrel through a single transmission unit and the operable connection of said first gear means and said third gear means acting to drive said carriage and said mandrel independently through both of said transmission units.

References Cited

UNITED STATES PATENTS 2,340,436   2/1944   Stone et al.
3,397,850   8/1968   Anderson.

NATHAN L. MINTZ, Primary Examiner